United States Patent
Fagot-Revurat et al.

(10) Patent No.: US 7,916,012 B2
(45) Date of Patent: Mar. 29, 2011

(54) HYBRID RESONANT STRUCTURE TO VERIFY PARAMETERS OF A TIRE

(75) Inventors: Lionel Fagot-Revurat, Barberier (FR); Sylvain Ballandras, Besançon (FR); Jérémy Masson, Montsoult (FR); William Steichen, Roquefort-les-Pins (FR)

(73) Assignee: Michelin Recherche Et Technique S.A., Granges-Paccot (FR)

( * ) Notice: Subject to any disclaimer, the term of this patent is extended or adjusted under 35 U.S.C. 154(b) by 374 days.

(21) Appl. No.: 11/996,669

(22) PCT Filed: Jul. 28, 2006

(86) PCT No.: PCT/EP2006/064784
§ 371 (c)(1),
(2), (4) Date: Aug. 5, 2008

(87) PCT Pub. No.: WO2007/012668
PCT Pub. Date: Feb. 1, 2007

(65) Prior Publication Data
US 2008/0303650 A1    Dec. 11, 2008

(30) Foreign Application Priority Data
Jul. 29, 2005 (FR) .................................. 05 52396

(51) Int. Cl.
*B60C 23/00* (2006.01)
(52) U.S. Cl. .......... 340/447; 340/442; 73/146; 73/146.5
(58) Field of Classification Search .................. 340/447, 340/442, 445, 446; 73/146, 146.5; 116/34 R; 200/61.22
See application file for complete search history.

(56) References Cited

U.S. PATENT DOCUMENTS

| | | | |
|---|---|---|---|
| 6,441,703 B1 | 8/2002 | Panasik | |
| 6,548,942 B1 | 4/2003 | Panasik | |
| 6,666,079 B2 | 12/2003 | Poulbot et al. .................. 73/146 |
| 7,005,987 B2 * | 2/2006 | Sinnett et al. .............. 340/572.1 |
| 7,489,067 B2 * | 2/2009 | Metzger et al. ................ 310/358 |
| 2004/0239504 A1 | 12/2004 | Kalinin | |
| 2005/0093688 A1 | 5/2005 | Sinnett | |
| 2007/0040473 A1 | 2/2007 | Ballandras et al. ........... 310/320 |

(Continued)

FOREIGN PATENT DOCUMENTS
DE    10316716    4/2003

(Continued)

OTHER PUBLICATIONS

Bernhard Jakoby, Heinz Eisenschmid and Falk Hermann "The Potential of Microacoustic SAW and BAW Based Senors for Automotive Applications" IEEE Sensors Journal, IEE Service Center, NY, NY vol. 2, No. 5, Oct. 2002.

(Continued)

*Primary Examiner* — Hung T. Nguyen
(74) *Attorney, Agent, or Firm* — Fitzpatrick, Cella, Harper & Scinto

(57) ABSTRACT

Control of running conditions, and particularly physical parameters of tires are recommended to increase automobile safety. A sensor according to the invention is used to determine various factors such as the temperature or pressure of tires. The sensor is a hybrid resonant passive structure that may be integrated in the vehicle ground connection, and particularly in the rubber of the tire when it is manufactured.

13 Claims, 2 Drawing Sheets

U.S. PATENT DOCUMENTS

2007/0103037 A1    5/2007    Metzger

FOREIGN PATENT DOCUMENTS

| | | |
|---|---|---|
| EP | 0937615 | 2/1999 |
| EP | 1120910 | 8/2001 |
| EP | 1275949 A1 | 6/2002 |

OTHER PUBLICATIONS

E. Benes, M. Gröschl, F. Seinfert, A. Pohl "Comparison Between BAW and SAW Sensor Principles" IEEE Transaction on Utrasonics, Ferroelectrics and Frequency Control IEE USA, vol. 45, No. 5, Sep. 1998.

* cited by examiner

HYBRID RESONANT STRUCTURE TO VERIFY PARAMETERS OF A TIRE

BACKGROUND OF THE INVENTION

1. Field of the Invention

The invention relates to the remote measurement of a physical magnitude of a tire while a vehicle is running, particularly through a radio frequency link and a passive component.

More particularly, the invention relates to resonant structures with bulk waves within piezoelectric films that are adapted for this restrictive use. The hybrid structure according to the invention may be optimized to increase its quality factor and its coupling factor in its frequency range.

The invention also relates to the use of hybrid resonators in a vehicle ground connection, for example at the tire, to make a remote wireless measurement of the running parameters such as the temperature of the rubber of a tire or the internal air pressure. The invention also relates to the use of resonant structures to transform active MEMS (micro-electromechanical systems) to passive MEMS, in other words that can be remotely queried and that are not connected to a power supply source.

2. Description of Related Art

To increase automobile safety, it appears desirable to integrate systems for real time monitoring of the performances of tires and/or their usage conditions. To achieve this, a tire instrumentation channel is aimed at integrating electronic devices such as sensors, for example so as to monitor parameters related to the use and/or wear of tires. For example, marketed TPMSs ("Tire Pressure Monitoring Systems"), that usually consist of sensors integrated into tire valves, notify the driver if his tire pressure is correct and detect leaks.

As soon as it becomes possible to consider measuring a physical parameter of a tire mounted on its wheel under running conditions, the problem of the energy available to make this measurement and transmit it to a control system inside or outside the vehicle arises; electronic devices must also comprise a means of supplying power to sensors and retrieving and even processing signals. Existing solutions used for most currently installed TPMS systems are based on the use of batteries associated with strategies for energy management so that they do not need to be replaced throughout the life of the tires.

However, the ideal solution relates to passive sensors, in other words sensors which do not require any energy source onboard the tire/wheel assembly but are powered by a remote radio frequency wave or by an auto-energy generation system associated with the tire. In the case of a power supply through a radio frequency wave, a query signal is sent to the sensor on which an antenna is installed; after the signal has been received, the sensor sends a radio wave that contains information about the physical parameter to which it is directly or indirectly sensitive.

Thus, it is known for example in document EP 0 937 615, that Surface Acoustic Wave (SAW) sensors can be used to passively measure physical parameters such as bond of the tire by radio frequency waves; this SAW sensors solution was developed particularly for data transmission (US 2005/093688).

SAW sensors may be of the "delay line" type (the phase difference between several echoes generated by the sensor will depend on the parameter to be measured) or the "resonator" type (the resonant frequency of the sensor will depend on the parameter to be measured). Resonator type sensors, due to their compact size, are usually better adapted to the measurement of a physical parameter of the tire if access to this parameter requires integration of the sensor during manufacturing of the tire.

However, a high performance measurement by a resonator type sensor requires a high resonance quality for optimum detection precision of its resonant frequency, and the lowest possible insertion losses in the resonator (to optimize the use of energy sent by the query radio wave since the system is passive), and a sufficient sensitivity to the physical parameter to be measured for the envisaged application. The SAW resonator may be limited for the envisaged applications, in order to optimize these three performance criteria without increasing the final size of the sensor; SAW resonators with minimum insertion losses and therefore with maximum coupling (10% instead of 1%, for example by varying the piezoelectric material of the support) have insufficient resonance quality factors.

Furthermore, the sensitivity of SAW resonators to the physical parameter to be measured, and particularly the temperature, may be much too high to guarantee that radio emission standards (FCC or ETSI) are respected, particularly in the 433.92 MHz ISM band: thus the high thermal sensitivity causes resonance outside the authorized frequency bands. Finally, such resonant surface wave structures must be a certain size related to the acoustic wave length and their very configuration, that requires a minimum length to perform their spectral function: a typical sensor is usually 5 mm×5 mm.

One envisaged alternative could be the use of bulk wave resonators based on putting a piezoelectric material blade into vibration, in which two facing electrodes clamp a plate of piezoelectric material; application of a radio frequency field to the dipole terminals thus created, generates deformation of the plate by inverse piezoelectric effect, depending on the couplings allowed by the crystalline orientation of its component material.

Quartz is found to be the preferred material for this type of application, taking account of its thermoelastic properties (high mechanical quality coefficients, existence of orientations compensated for temperature effects, etc.). Such a typical resonator operates at the order of 1 MHz, which is much too low for optimum radio frequency detection; in order to increase the frequency, it becomes necessary to thin the usual solid materials down to the thicknesses that make any industrial application (for which the minimum thickness of the plates is of the order of 30 µm) risky: a frequency of 1 GHz represents the practical limit for the use of classical bulk wave resonators.

These bulk acoustic wave BAW oscillators cannot be used in practice, particularly for the measurement of running parameters in a severe environment: no alternative to SAW sensors has yet been marketed.

SUMMARY OF THE INVENTION

The invention describes how to overcome the disadvantages of existing sensors and to provide a BAW type resonator adapted to the measurement of running parameters, particularly a tire, in a vehicle ground connection, and it has many other advantages.

Thus, the envisaged option enables simultaneous optimization of the parameters described above including insertion loss, resonance quality, sensitivity and size.

In particular, the invention relates to a resonator for measuring parameters under severe vibration and temperature conditions. The resonator according to the invention is a resonant hybrid structure that has a high coupling level and that is capable of simultaneously overcoming difficulties encountered with the BAW solution at high frequency, the impossibility of working at low frequency on simple FBAR (Film Bulk Acoustic Resonator) structures, and the lack of sufficient coupling when working with composite structures.

Therefore according to one of its aspects, the invention relates to a hybrid acoustic resonant structure adapted for use as a sensor of a running parameter of a ground connection, comprising a piezoelectric transducer that comprises two electrodes surrounding a layer of piezoelectric material in the form of a thin film. One of the two electrodes is installed on a support and the other may be coated with an additional layer, the thickness of which is determined as a function of the thickness of the substrate and the operating parameters of the resonator, to optimize the acousto-electric density within the piezoelectric film. The thicknesses determine a natural frequency of the resonator, one harmonic of which is in the targeted radiofrequency range, in other words is preferably between 300 MHz and 3 GHz.

The support may be a substrate, advantageously in the form of a blade or a Bragg mirror placed on a substrate; the additional layer or the upper electrode may also be covered by a Bragg mirror. The resonant structure according to the invention provided with a Bragg mirror may advantageously be fully or partially encased in a protection layer that may act as encapsulation, particularly using standard selective encasing procedures for making a "packaging", or may be placed in a low-cost electronic component package; at least one Bragg mirror is chosen so that its reflection coefficient is maximum at about the resonant frequency of the structure.

The substrate may be composed of several materials that advantageously have mechanical and dielectric quality factors such that the product QF of the resonant structure exceeds 3 or 5×1012; it may also be monocrystalline silicon. The piezoelectric layer is advantageously composed of aluminum nitride, that may be deposited for example by cathodic sputtering, or a single crystal that may be added on by molecular gluing followed by thinning. The electrodes are advantageously metallic layers deposited or integrated on their support, namely substrate, Bragg mirror or piezoelectric layer. The additional layer may be or may not be piezoelectric; preferably, it will be placed by epitaxial growth of a monocrystalline material, but it may also comprise a material like that used for the substrate.

The structure according to the invention may be associated with an element of the ground connection of an automobile vehicle, for example by gluing. According to one preferred embodiment, it is built into the rubber of a tire during its manufacture.

According to one particularly preferred embodiment, the structure according to the invention is coupled to a radio frequency antenna in order to make a transponder function. Such a transponder may be associated with one or several other hybrid resonant structures to make differential measurements, particularly of the temperature.

According to another aspect, the invention relates to the use of a hybrid resonant structure, in other words a BAW resonator with a piezoelectric film, and not a usual SAW resonator to measure a running parameter of a vehicle, particularly the temperature, or to act as a strain gauge in a MEMS sensitive to a running parameter of a vehicle, and particularly the pressure.

Note that within the context of this invention, the term "tire" means equally an inflatable tire or an elastic tread or a track, and all these terms should be interpreted as being equivalent; the "ground connection" 1 of a vehicle includes the tire 2 as defined above and the elements forming part of it such as the inserts 3, and all components that connect it to the vehicle body 4, namely the wheel, the rim, the braking system 5, the damping system 6, the axle, etc. as far as the articulation 7 as shown in FIG. 1.

BRIEF DESCRIPTION OF THE DRAWINGS

Other characteristics and advantages of the invention will become clearer after reading the following description with reference to the attached drawings, given solely for illustrative purposes and that are in no way limiting.

DETAILED DESCRIPTION OF THE INVENTION

While running, the tire temperature is an important factor affecting safety. It thus appears desirable to be able to measure it regularly by a direct measurement in order to notify the driver when the tires are not at an appropriate temperature for optimum grip, or to optimize their life. Consequently, it is desirable that a passive sensor and its data transmission system, in other words in most cases its antenna itself, to set-up a radiofrequency connection with the vehicle query device, should be integrated directly into the tire during manufacture. The intrusion of the sensor must then be as low as possible, the instrumentation of a tire remaining an accessory, and the main function of the assembly obtained still being to assure optimum running conditions; it is important that the different devices integrated into the tire do not modify its mechanical performances nor its life. One of the surfaces of an SAW sensor must remain free, consequently additional constraints on packaging appear for such integration, which increases their size even further.

Due to the possibility of making piezoelectric thin layers on non-piezoelectric substrates, it is found possible to excite bulk waves within piezoelectric films, often with longitudinal polarization, simultaneously with very high propagation speeds and a high piezoelectric coupling (a few percent). Thus, different BAW resonators with thin piezoelectric films have been developed: Thin Film Resonators (TFR_ on a substrate, machined on the surface or in bulk (FBAR "Film Bulk Acoustic Resonator", HBAR "Harmonic Bulk Acoustic Resonator"), or with Bragg mirror (SMR "Solidly Mounted Resonator"). For such a hybrid resonant structure comprising a piezoelectric film, coupling between the electrical energy and the piezoelectric medium is maximum if the maximum stress is applied at the middle of the piezoelectric layer. Consequently, electromechanical coupling, temperature effects and stresses and the acoustic insulation of the resonator are uncoupled phenomena in the first order, and consequently are usually considered as being independent: the relation between such phenomena is not trivial.

These hybrid resonant structures have the advantage over surface wave sensors that they are very much smaller in size; in particular, the embodiments according to the invention presented below may be of the order of 200 μm×200 μm. Furthermore, particularly in the preferred "Bragg mirror" configuration, it is possible to encase the sensor and its connection with the antenna at low cost, to achieve a structure that may be directly integrated into the rubber before vulcanization of the tire, without complex encapsulation of the system.

Figure 1:
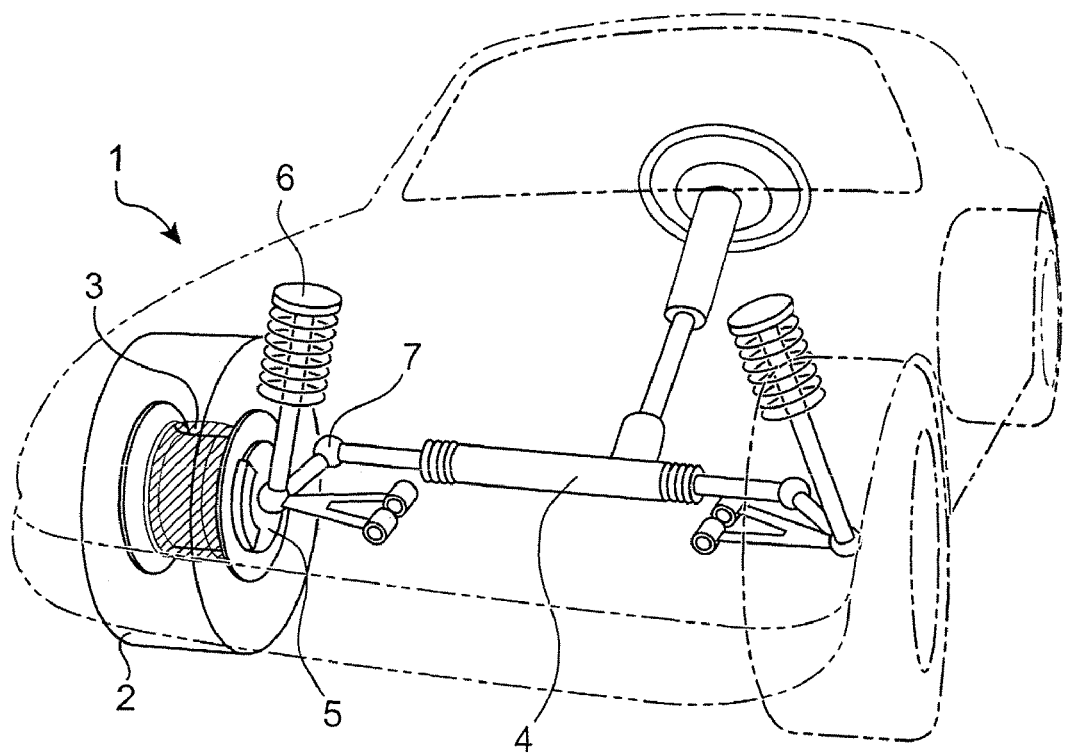
FIG. 1 diagrammatically shows the ground connection of a vehicle and different sensor locations.
Figure 2:
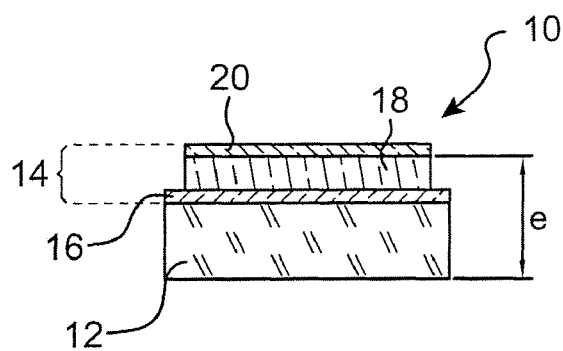
FIG. 2 shows a hybrid resonator.

Basically, and as shown in FIG. 2, a hybrid resonator 10 according to the invention comprises a blade 12 made from a material acting as a substrate. A piezoelectric transducer 14 is arranged on the blade of the substrate 12. The transducer 14 comprises a first electrode 16 deposited on the surface of the blade 12; advantageously, the thickness of the layer from which the first electrode 16 is made is less than $\lambda_{16}/20$, where $\lambda_{16}$ is the wavelength of the acoustic wave propagating inside the layer. The first electrode 16 is composed of a preferably good electrically conducting material so as to limit resistive losses; advantageously it is a metal (Al, Mo, Ni, Ag, Pt, Au, W, Cu, . . . ), chosen so that, if possible, it can be deposited in an oriented manner, on the surface of the substrate 12.

The transducer 14 comprises a layer of piezoelectric material 18 placed above the first electrode 16; the existing process that depends on the nature of the piezoelectric material is chosen to minimize texture defects of the layer 18 that form dissipation sources prejudicial to confinement of the electroacoustic energy in the thickness of the structure 10. Thus, lithium niobate, potassium niobate, aluminum nitride, zinc oxide and other piezoelectric materials can be deposited. The film thickness has an influence on the coupling ratio (as explained later); preferably, for an acoustic wavelength $\lambda_{18}$ within the piezoelectric layer 18, optimum coupling is obtained for a layer thickness equal to $\lambda_{18}/2$ or any odd multiple of $\lambda_{18}/2$.

A counter-electrode 20 is then deposited on the surface of the piezoelectric material 18. As in the case of the first electrode 16, this second electrode 20 is composed of a preferably good electrically conducting material, advantageously made from a material that can be deposited in an oriented, or better epitaxied manner. Similarly, advantageously, the thickness of the layer of the electrode 20 is less than $\lambda_{20}/20$, where $\lambda_{20}$ is the wavelength of the acoustic wave that propagates inside the material of the electrode 20.

The main technological difficulty with making such a component 10 lies in the elimination or local thinning of the substrate 12 located on the back face of the piezoelectric layer 14 so as to enable the vibration to be set-up freely: the substrate 12 existing under the piezoelectric membrane 18 is capable of generating parasite modes, because the natural frequency $F_0$ and the operating frequency F of the resonator 10 depend directly on the thickness of the substrate 12. The substrate 12 may be thinned to reach this thickness before or during the manufacturing process of the resonator 10; it is also possible to modify the thickness of the substrate 12 once the resonator 10 has been made, for example by taking advantage of the operation to adjust the resonant frequency of the device 10.

This structure 10, called a hybrid resonant structure, has many different modes corresponding to the different possible harmonics of the fundamental mode of the structure. It thus becomes easier to change the radiofrequency band than it is with resonator type SAW structures, which correspondingly increases operating frequencies $F_0$ of the device and therefore reduces its size.

Consequently, a structure 10 like that shown in FIG. 2 resonates naturally at very high or very low frequencies, which penalizes its use as a radiofrequency transponder, in other words preferably within the 300 MHz-3 GHz range. Due to composite use according to the invention, it is possible to adapt the operating frequency of the resonator 10 by the choice of a mode corresponding to the required range, using a harmonic with rank $N \neq 1$ rather than a non-fundamental resonant mode.

The natural resonant frequency $F_0$ of such a structure 10 is given by the relation $F_0=V/2e$ where e is the effective thickness of the composite plate composed of the thin layer 14/substrate 12 and V is the equivalent speed of the mode, which depends mainly on the elastic properties of the substrate 12 (preferably a monocrystal), slightly disturbed by the film 18. The different layer thicknesses, and particularly the monocrystalline blade 12, is chosen so that one of the rank N harmonic resonances of the stack corresponds to the required operating frequency F of the resonator 10; furthermore, the structure can be sized to obtain a spectral difference between two resonances very much higher than the working frequency band (for example 1.8 MHz for the band centered at 433.92 MHz). Thus, the chosen resonance may be selected precisely.

Advantageously, the substrate 12 is made from a material with the highest possible mechanical and dielectric quality factors, so that the product of the quality factor×resonant frequency (QF) of the useful mode is greater than $3·10^{12}$, for example a resonance quality coefficient of the useful mode more than 8000 at about 400 MHz. A good resonance quality is desirable for the measurement, and is related to the quality factor Q. This quality factor Q is of the order of 8500 to 10000 at 433 MHz for an SAW, and therefore a comparable result can be obtained with a structure according to the invention. For example, the material may be chosen among crystalline or monocrystalline quartz, glass or amorphous silica, langasite $La_3Ga_5SiO_{14}$ and its variants (langanite $La_3Ga_5,5Nb_0,5O_{14}$, langatate $La_3Ga_5,5Ta_0,5O_{14}$, etc.), gallium phosphate, sapphire, lithium niobate, lithium tantalate, diamond carbon, silicon carbide, etc.

Polarization is fixed by piezoelectric coupling of the film 18. Moreover, conversion of mechanical energy into electrical energy depends on coupling between the materials. Preferably, the characteristics of the piezoelectric material 18 are sufficient to achieve an electromechanical coupling for the composite resonator 10 in the selected operating mode F, greater than or equal to the coupling of surface waves on quartz in sections (ST, X), namely usually 1%. Advantageously, materials with a high coupling coefficient are used, such as aluminum nitride (AlN) or zinc oxide (ZnO) that are reasonably easy to implement using different methods, particularly on silicon. The choice of the thickness varies as a function of the nature of the piezoelectric layer 18, applications and technological implementation limits.

Preferably, the structure 10 according to the invention is of the "HBAR" type, in which energy is distributed approximately homogenously between the piezoelectric layer 18 and the substrate 12. These structures 10 are characterized by resonance on the harmonic of the substrate 12/piezoelectric layer 18 assembly, with a total active thickness equal to at least one wavelength. The acoustic energy is not confined in the piezoelectric layer 18, but on the contrary is very much present in the substrate 12. Conversely, in a "FBAR" type structure, the acoustic energy is naturally confined in the piezoelectric layer 18, and the structure is characterized by a resonance of the piezoelectric layer 18 in the fundamental mode (a half wavelength or similar).

As mentioned above, for a composite resonant structure 10 comprising a piezoelectric film 18, coupling between the electrical energy and the piezoelectric medium is maximum if the maximum stress is applied at the middle of the piezoelectric layer, and the upper layer 20 can be thickened so as to displace the position of the maximum expansion within the piezoelectric layer 18, using the propagation effect.

However, it is preferable that the elastic energy can propagate within an additional thickening layer 22 added onto the electrode 20, to avoid the severe degradation of the additional tension coefficient of the resonant structure 10. A coupling factor of 5% can thus be obtained. Therefore, according to the invention, the stack 12, 16, 18, 20 is preferably completed by an additional layer 22 deposited on the surface of the counter electrode 20. This additional element 22 is composed of one or several materials chosen with high mechanical and/or dielectric quality factors, so as to limit intrinsic losses of the device 10. Advantageously, depending on the nature of the counter-electrode 20, the layer 22 may be made by epitaxy, thus guaranteeing its orientation.

The layer 22 is used to concentrate the acousto-electric energy of the useful mode in the piezoelectric layer 18; in the limiting case, this is a global impedance adaptation element of the device 10. Advantageously, growth of the additional layer 22 is such that this layer 22 has a texture capable of obtaining sufficient over-tension values to limit intrinsic losses of the device 10. In particular, for an HBAR type resonant structure 20, this additional layer 22 is such that the energy is not confined in the piezoelectric layer 18, although it is significantly present, by positioning the maximum stress in this layer 18.

In fact, it is impossible to consider the addition of an additional layer as being obvious for a person skilled in the art because none of the known HBAR embodiments includes this additional layer that makes it possible to displace the maximum stress.

The material from which the layer 22 is made is preferably chosen from among materials used to make the substrate 12, particularly monocrystalline quartz, glass or amorphous silica, langasite and its variants (langanite, langatate, etc.), gallium phosphate, sapphire, lithium niobate, lithium tantalate, diamond carbon, silicon carbon, etc. The additional layer 22 may or may not have piezoelectric properties; it may also comprise aluminum nitride and potassium niobate.

The choice of thicknesses of the different layers and particularly the blade 12 is calculated such that one of the harmonic resonances rank N ($N \geq 1$) of stack 14, 22 corresponds to the operating frequency F of the resonant structure 10.

In one preferred embodiment, the component elements are chosen such that the sensitivity to stress is as high as possible, so that stress effects induced by deformation of the body within which it is located can be measured, after it has been integrated into a specific deformable system.

Figure 3:
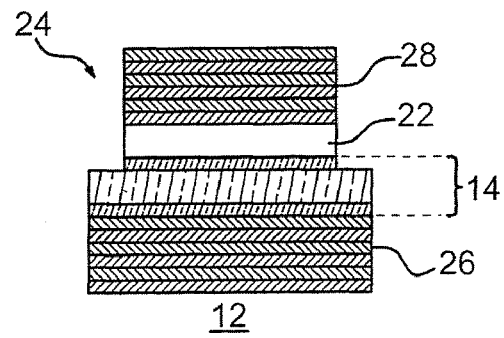
FIG. 3 illustrates a hybrid resonator with Bragg mirror and an additional layer according to a preferred embodiment of the invention.

Furthermore, the resonator 10 according to the invention may be provided with at least one Bragg mirror. A resonant structure 24, shown in FIG. 3, also comprises a Bragg mirror 26 on the lower face of the transducer 14, between a substrate 12 and the first electrode 16, which among other things can cause an impedance break, and/or a Bragg mirror 28 on the upper face of the additional layer 22 designed to concentrate energy.

As is often the case, each Bragg mirror 26, 28 is composed of an alternation of layers of materials with different reflection coefficients, for which the thickness is an odd multiple of $\lambda/4$, where $\lambda$ is the wavelength of the wave that propagates inside the network 26, 28: the successive reflections on the different layers create the mirror effect; for example, stacks are composed by alternating Si and $Si_xN_y$ layers. The reflection coefficient of each mirror 26, 28 is advantageously chosen to be maximum close to the resonant frequency of the structure 24.

The structure of the layers used to make each mirror 26, 28 is chosen to make a stop band (in other words the spectral domain in which the mirror performs its total wave reflection function) centered around a harmonic resonance, itself chosen for its specific coupling qualities, quality coefficient, thermal sensitivity, etc. It may also be interesting to improve the spectral purity of the resonator 24 by making a stop band of the mirror 26 such that the band width is less than the distance between two harmonics of the resonant structure 24.

In particular, in the presence of a double mirror 26, 28, it is possible to adjust the structure of each of the mirrors such that their spectral response is slightly offset: the filtering function is thus wider than that in a configuration with a single mirror or with two symmetric mirrors. Advantageously, the front mirror 28 is offset such that the chosen resonance frequency is in the lower part of the stop band and the rear mirror 26 is such that the resonant frequency is located in the high part of the stop band, or vice versa.

In particular, in the case in which integration into the tire is considered, but also for any other use, in this configuration in which the resonant structure is provided with one or several Bragg mirrors, it is possible to include one face or the whole structure 24 according to the invention in an encasing material; depending on the application, this encasing may act as encapsulation. An acoustic absorbent, for example a layer of organic material such as a polymer, particularly based on epoxy resin, may thus be deposited on the surface of at least one Bragg mirror 26, 28, so that the contribution of modes not reflected by the mirror to the electrical response of the resonator 24 can be eliminated; it is desirable that the encasing material should be compatible with the rubber of a tire such that during vulcanization, the structure according to the invention is fully integrated into the tire, for example an Epoxy E514 (Epotechny™) resin.

It thus appears that the hybrid resonator according to the invention is capable of obtaining better efficiencies or couplings than SAW structures, while having high resonant qualities and being compact. Therefore energy losses with the sensor are minimized, which is advantageous and increases the reliability, while broadening application fields of this type of passive system to include tires and the ground connection. Furthermore, manufacturing of hybrid resonant structures makes use of microelectronics technologies, particularly with wafer deposition processes in which the basic material may be silicon, at a cost much less than the cost of quartz used for SAWs.

Figure 4:
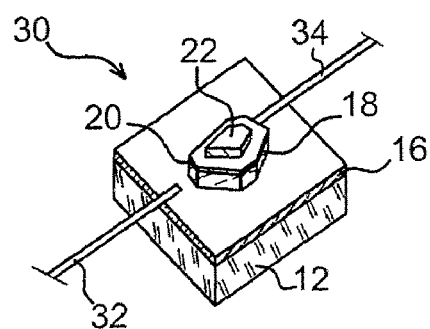
FIG. 4 shows a transponder according to the invention.

In one preferred embodiment, the resonator according to the invention may be used as a transponder 30 as shown in FIG. 4. A resonator 10 is provided with an antenna, in this case of the dipole type with two strands 32, 34, which is connected to it: it is then possible to excite the electrical resonance of the structure 10 by placing it in the field of an emitter operating in the corresponding frequency range. After excitation, the natural frequency of the structure 12, 16, 18, 20, 22 will be re-emitted and it can be analyzed using an appropriated device. It is thus possible to make a transponder 30 for which the signal is slaved to the state of the structure at the time of reception. Another advantage is that it appears to be possible to adjust the modulus of the resonant impedance independently of other electrical characteristics such as coupling, thermal drift, etc. It is then easier to optimize energy exchanges with the antenna connected to it, by varying the Standing Wave Ratio (SWR).

Furthermore, when the invention is used as a passive transponder, encasing, depending on whether it is partial or total, may allow the antenna wires to pass through or to be encased. The lack of specific encapsulation, integration of the electromechanical link between the antenna and the sensor, and the absorbent within the encasing, enable a large reduction in the final cost of the transponder.

Thus, a hybrid resonator 10, 24, 30 according to the invention, either integrated into the rubber of the tire or glued to an element of the ground connection makes it possible to measure the running temperature. In particular, the resonant structure 10, 24 according to the invention may be made using a set of materials that increase its sensitivity to temperature variations. For example, materials for which the coefficients of variation of the frequency as a function of the temperature (CFT) are preferably of the same sign so that effects can be accumulated, for example like lithium niobate and silicon, both of which have a negative CFT.

In another case, in order to limit the sensitivity to temperature variations, for example when the available frequency band for the query is low, two materials for which the CTFs are varying in opposite directions such as AlN and Si, may be used. In this case, the resonant frequency of the entire structure 10 then varies as a function of the temperature, and the function of the transponder 30 can be used for example to directly monitor changes in temperature variations.

Such a transponder 30 may be associated with another resonator 10, 24 according to the invention. In this case, the difference between couplings and resonant impedances of resonant structures is advantageously minimized so as to limit differential losses, and therefore to enable a corresponding remote query of the structures with the same performances, particularly in terms of a query distance. Thus, the reply to a query is homogenous in terms of the response level between the different resonators at the same query distance.

Advantageously, two resonant structures 10 are used jointly such that the frequencies of resonant structures have opposite drifts as a function of the temperature, which doubles the sensitivity of the assembly thus created. In particular, the sensitivity of the electrical measure may be optimized by placing the resonator with a positive thermal drift of the frequency at the input to the authorized frequency band, and the resonator with a negative thermal drift of the frequency at the output from said band. The difference between the basic frequency and the current frequency is determined for each resonator taken separately, and the sum of the differences measured for each resonator for the same temperature variation, is equivalent to a thermal drift equal to twice the unit value.

Conversely, if the whole of materials chosen is such that the temperature sensitivity of the useful resonant frequency (in the chosen query band) is as low as possible, the resonant structure can then be integrated into a specific deformable mechanical structure for a direct measurement of stress effects: deformation of the mechanical structure leads to a modification of the acoustic properties of the resonator, which causes a variation of its resonant frequency(ies). The deformable mechanical structure may be in the form of a rigid bar connected to a deformable membrane for which the thickness is adjusted to optimize the stress range to be measured and the useful resonance, representative of the required information.

Figure 5:
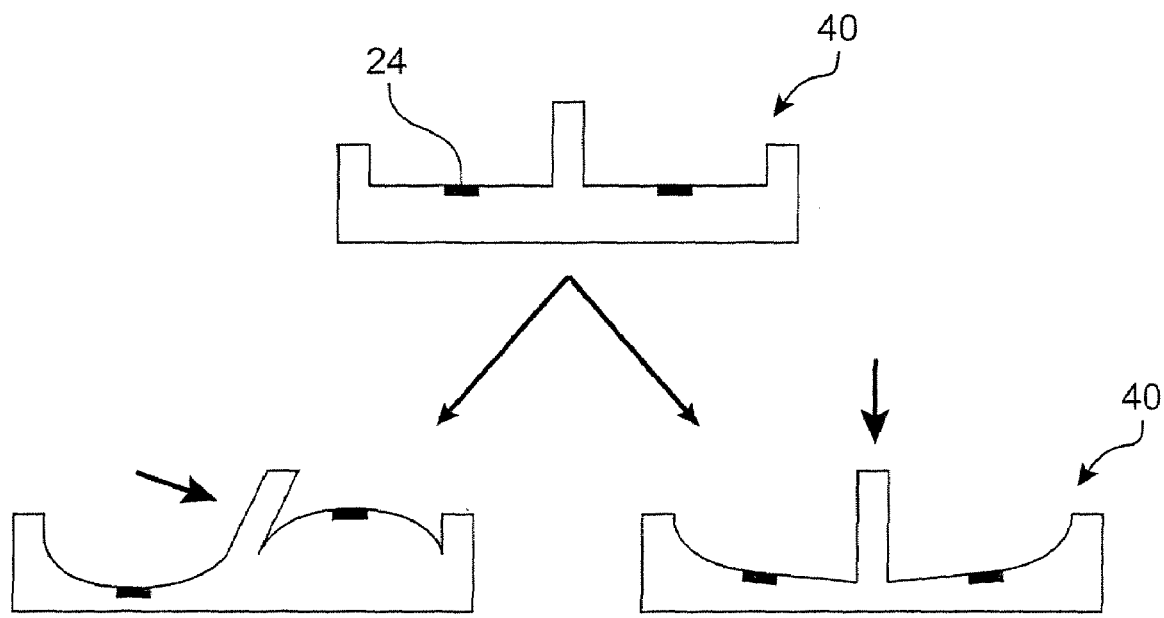
FIG. 5 shows another use of a resonator in a MEMS, according to the invention.

The resonator according to the invention can thus indirectly measure the tire pressure (or any other three-dimensional stress), using several hybrid structures such as stress gauges on a silicon MEMS, due to their compatibility: once again, the device according to the invention can be integrated during the MEMS manufacturing process due to its small size and the base material that is routine. For example, a nail sensor 40 like that illustrated in EP 1 275 949 can be made passive: piezoresistive strain gauges etched on MEMS 40 may be replaced by resonant hybrid structure type strain gauges 24 as shown in FIG. 5, which is possible considering the small size of devices according to the invention.

It is also possible to have several resonant structures according to the invention on the same deformable mechanical structure, particularly a tire, some being arranged on parts sensitive to strain and others on parts not affected by strain or on a neutral axis so as to have a reference. The measurement of the change of each frequency with respect to the fixed reference can then firstly isolate the residual thermal drift and secondly measure the effect of strain; it is also possible to return to the direction (sign) of the effects to be measured. In the same way, the influence of the temperature measurement can be eliminated by using a reference for which the thermal sensitivity is equal to the thermal sensitivity of the test body, such that the frequency drift between the reference resonator and measurement resonators is equal regardless of the working temperature.

According to another application, the resonant structure according to the invention may be coupled in series to a capacitive test body, the value of which varies as a function of a physical parameter to be measured: the resonant frequency varies as a function of the value of the capacitance. The set of elements making up the resonant structure is chosen such that the sensitivity of the useful resonant frequency (in the chosen query band) is as small as possible, and the geometry is selected to optimize the electromechanical coupling so as to make a capacitance measurement by frequency pulling. The query is then made using the transponder function of the resonant structure to directly monitor the change of capacitance variations. Advantageously, the resonant structure has a static capacitance, the value of which is close to the value of the capacitance to be characterized.

In order to optimize the sensitivity, in this case the structure is designed such that the static capacitance of the resonator is approximately equal to the typical capacitance of the capacitive test body. In order to further improve the sensitivity, a set comprising at least two resonant structures can be used, only one of which is coupled to the test body, the other being used as a reference. The invention can also be used by coupling the capacitive test body in parallel.

In particular, resonators according to the invention have a high over-tension so as to determine the frequency and its variation with sufficient precision: very low insertion losses so as to not unnecessarily dissipate energy received during transduction; robustness to hostile environmental conditions to which they may be subjected either during placement or during operation, for example with a temperature of between $-50°$ C. and $500°$ C.

What is claimed is:

1. An element of a vehicle-to-ground connection, comprising:
    at least one hybrid resonant acoustic structure acting as a sensor, wherein the resonant acoustic structure includes:
        (1) a support; and
        (2) a piezoelectric transducer, wherein the transducer includes:
            (a) a first conducting electrode supported by the support,
            (b) a second conducting electrode,
            (c) a film of piezoelectric material separating the first and second conducting electrodes, the film of piezoelectric material being positioned adjacent a first surface of the second conducting electrode, and
            (d) an additional layer positioned adjacent a second surface of the second electrode, wherein the additional layer causes a maximum stress to be located within the film of piezoelectric material,
    wherein a working frequency of the resonant acoustic structure is in a radiofrequency spectrum from about 300 MHz to about 3000 MHz.

2. The element of the vehicle-to-ground connection according to claim 1, wherein the working frequency of the resonant acoustic structure in the radiofrequency spectrum is a harmonic with rank $N \neq 1$ of a natural frequency ($F_0$) of the resonant acoustic structure.

3. The element of the vehicle-to-ground connection according to claim 1 or 2, wherein the support is a silicon monocrystal substrate blade.

4. The element of the vehicle-to-ground connection according to claim 1, wherein the film of piezoelectric material is an aluminum nitride layer.

5. The element of the vehicle-to-ground connection according to claim 1, wherein the additional layer concentrates an acousto-electric density to cause the maximum stress to be located within the film of piezoelectric material.

6. The element of the vehicle-to-ground connection according to claim 1, wherein the additional layer is formed of a same material as the support.

7. The element of the vehicle-to-ground connection according to claim 1,
wherein the resonant acoustic structure further includes at least one Bragg mirror, the at least one Bragg mirror being positioned on the additional layer, between the support and the transducer, or both,
wherein each of the at least one Bragg mirror includes an alternation of layers of materials with different reflection coefficients, and
wherein a reflection coefficient of each of the at least one Bragg mirror is maximum close to a resonant frequency of the resonant acoustic structure.

8. The element of the vehicle-to-ground connection according to claim 7, wherein the resonant acoustic structure further includes a coating layer on at least one of the at least one Bragg mirror.

9. The element of the vehicle-to-ground connection according to claim 1, further comprising an antenna connected to the resonant acoustic structure.

10. The element of the vehicle-to-ground connection according to claim 9, further comprising at least one other resonant acoustic structure, wherein characteristics of each resonant acoustic structure enable differential measurement of a temperature.

11. The element of the vehicle-to-ground connection according to claim 1, wherein the resonant acoustic structure is integrated in tire rubber.

12. The element of the vehicle-to-ground connection according to claim 1, wherein the resonant acoustic structure is used to measure a running parameter of a vehicle.

13. The element of the vehicle-to-ground connection according to claim 12, wherein the running parameter is a temperature of a tire.

* * * * *

UNITED STATES PATENT AND TRADEMARK OFFICE
CERTIFICATE OF CORRECTION

| | | |
|---|---|---|
| PATENT NO. | : 7,916,012 B2 | Page 1 of 1 |
| APPLICATION NO. | : 11/996669 | |
| DATED | : March 29, 2011 | |
| INVENTOR(S) | : Lionel Fagot-Revurat et al. | |

It is certified that error appears in the above-identified patent and that said Letters Patent is hereby corrected as shown below:

On the Title Page

ITEM [56] OTHER PUBLICATIONS

"Senors" should read --Sensors-- and "IEE" should read --IEEE--; and
"Utrasonics" should read --Ultrasonics--.

COLUMN 4

Line 48, "(TFR_" should read --(TFRs)--.
Line 49, "bulk (FBAR" should read --bulk (e.g., FBAR--.

Signed and Sealed this
Eleventh Day of October, 2011

David J. Kappos
*Director of the United States Patent and Trademark Office*